Figure 1:
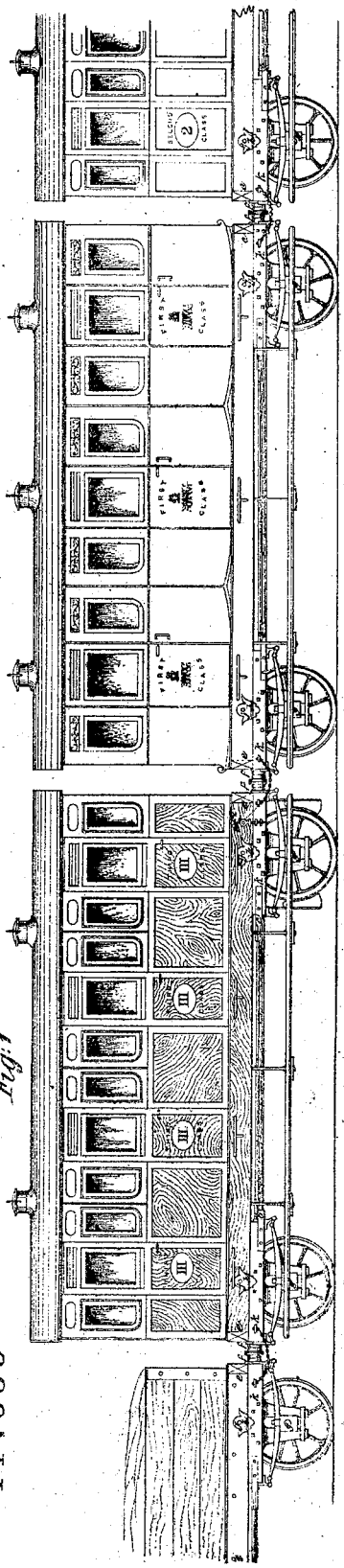

THE FLEXIBLE ROLLING STOCK.

PATENTED AUG 1 1871

GROVER'S PATENT.

TO REDUCE VIBRATION, WEAR & TEAR; MAINTENANCE & LOCOMOTIVE EXPENSES ON RAILWAYS & TRAMWAYS. ALSO TO LESSEN THE COST OF MAKING LIGHT RAILWAYS BY ALLOWING VERY SHARP CURVES TO BE USED.

117535

UNITED STATES PATENT OFFICE.

JOHN WILLIAM GROVER, OF WESTMINSTER, ENGLAND.

IMPROVEMENT IN ROLLING-STOCK OF RAILWAYS.

Specification forming part of Letters Patent No. 117,535, dated August 1, 1871.

*To all whom it may concern:*

Be it known that I, JOHN WILLIAM GROVER, of No. 9 Victoria Chambers, Westminster, in the county of Middlesex, England, civil engineer, have invented an Improved Construction of the Rolling-Stock of Railways; and do hereby declare that the following description, taken in connection with the accompanying drawing hereinafter referred to, forms a full and exact specification of the same.

My invention has reference to an improved construction of that system of railway and other carriages wherein the body is supported by wheels at each end only, which wheels are arranged to assume more or less radial positions on passing round curves. My invention consists in the construction of carriages, each provided with two swiveling bogie-trucks, whereby they are supported at their ends only, such trucks being coupled by diagonal rods or chains, and having appliances independently of the carriage-framing above for closely and rigidly connecting them to the contiguous truck of the nearest carriage in such manner as practically to form one single truck, substantially as hereinafter set forth. Also, in the construction of bogie-trucks, arranged as above set forth, with a central close coupling, in combination with lateral buffers, all arranged on the bogie-trucks, substantially as hereinafter described. The swiveling or bogie-trucks being arranged as near as possible to each end of the carriage, they are connected more or less rigidly to the contiguous trucks of the adjacent carriages, buffers being made to intervene between the frames of the bogie-trucks, so as to allow the axle or axles of each truck to assume a limited angular position relative to the axle or axles of the other truck on passing round sharp curves. Instead of coupling the two trucks of one carriage by rigid diagonal struts or ties, the same effect may be produced by coupling them together by means of chains passing diagonally round pulleys fixed to the trucks, or by means of rigid arms or poles projecting from each truck and geared together by a pin and slot or by toothed segments.

One advantage of my above-described improved system consists in this, that whereas in the ordinary bogies the wheel-base of the one bogie is the measure of its stability, in my arrangement the measure of stability is the sum of the wheel-bases of all the bogie-trucks coupled together in one train; also, the bogie system is obtained in a train having only two axles to each carriage, as usual. Furthermore, whereas the system of swiveling four-wheeled bogie-trucks has hitherto involved eight wheels to each carriage, and generally other systems of radiating the axles have involved six wheels at least to each carriage, now, by my system, the advantages of the bogie-truck and radiating axles can be conferred on four-wheeled carriages.

Figure 2:
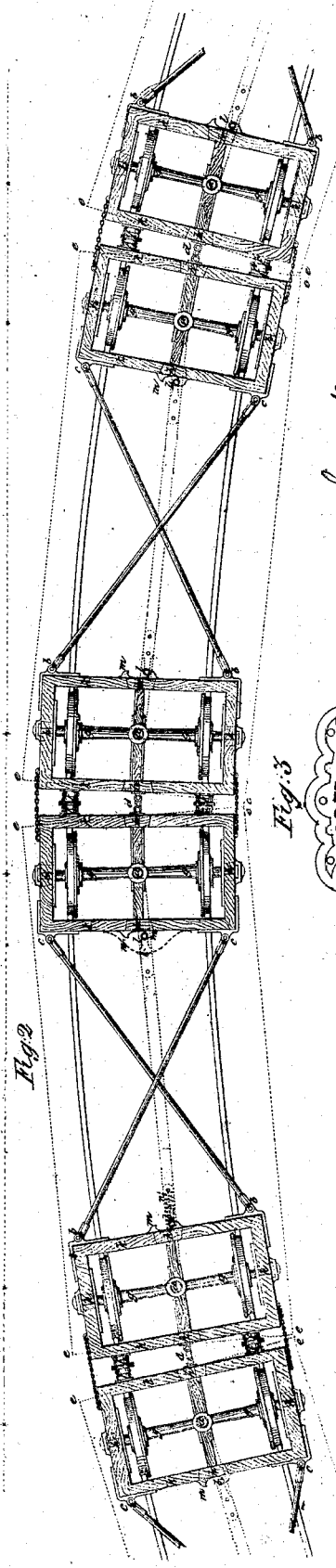

Figures 1 and 2 on the accompanying drawing show, respectively, a side elevation and plan of the under framing of two coupled railway carriages constructed according to my invention.

Figure 3:
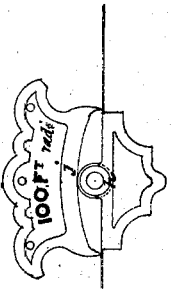

*g g* are the axles, which are secured in bogies or trucks *k k k k*, centering at *a*, by a pin which passes through a member or center beam of the carriage-frame *e e e e*. Under this carriage-frame, and connecting the opposite corners of each pair of bogies or trucks, is provided an arrangement of diagonal rods or equivalent contrivances to give the axles an equal and contrary motion. I prefer the arrangement of two diagonal ties, *b c b c*, as shown, which may, by preference, be slotted at the ends. To produce the requisite stability the trucks are coupled at *d*, which coupling should, however, allow of some play, and buffers are employed at *f* so as to assist in effecting complete radiation of the trucks and axles and to equalize errors in passing from a curve to a straight part of the line. When, however, only two carriages are used the buffers will not be necessary. The diagonal ties *b c* may also be secured immediately over the axles, whereby the distance of the centers *a a*, under each carriage, from each other would always be constant, but in cases where the points *g* do not coincide with *b* and *c*, as in the drawing, allowance must be made in the carriage-frame for the points *a a* under each frame to approach each other, either by slotting the holes in the carriage-frames or fitting them with India-rubber springs. *h h h* are small rollers, working in plates attached to the trucks *k k k k*, and on the carriage-frame roller-paths are provided to bear upon these rollers, as seen. These roller-paths are seen more clearly in the enlarged detail at Fig. 3, fixed on the sides of the carriage-frames at *j*, and they may, though not necessarily, be made slightly hollow in the center so that the axles may tend to return to their central position. This tendency of the axle to be normally at right angles to the carriage-frame may be still further promoted by springs or any other suitable means, such as the springs shown at $n$ or $n'$, fixed to the center beam shown in dotted lines. The plates $j$ may be provided, as shown on the drawing, with horns or stops at the ends, so as to prevent the trucks from swiveling beyond a certain point during single shunting or in accidents on the railway. To prevent the shocks in shunting from disturbing the center pins $a\ a$, auxiliary supports are provided at $t$, Fig. 2, securely fixed to the center beam of the carriage-frame, shown in dotted lines. Stops on the trucks $k\ k$ at $m\ m$ may also be provided, so as to assist in preventing undue radiation in the axles. The supports $t$ may, if necessary, be fitted with a spring. The couplings $d\ d$ should be provided with either a spring or slotted hole, as shown, so that in any backing or shunting the strains should come entirely on the buffers $f\ f$. In order to enable the trucks $k$ to be rigidly connected to the carriage-frame, when desired, in single shunting, staples may be fixed to the carriage-frame and to the trucks as at $w$, Fig. 1, through which a pin is passed, as shown, or any equivalent appliance may be employed for this purpose.

Having thus described the nature of my invention, and in what manner the same is to be performed, I wish it to be understood that I do not limit myself to the precise arrangements thereof, as shown on the accompanying drawing, as these may be variously modified without departing from the nature of my invention; also, I am aware that the contiguous bogie-trucks of two carriages have before been coupled together, and also that the two axles of one carriage have been connected so as to cause the radiation of the one axle to effect the radiation of the other axle, but not in the manner described by me, nor have these features been employed in combination as hereinbefore described; and

What I therefore desire to claim as my invention is—

1. Railway carriages, each provided with two swiveling bogie-trucks, whereby they are supported at or near their ends only, such trucks being coupled by diagonal rods or chains, and having appliances independently of the carriage-framing above for closely and rigidly connecting them to the contiguous truck of the next carriage, in such manner as practically to form one single truck, substantially as and for the purposes set forth.

2. Bogie-trucks, arranged as set forth in the first claim, with a central close coupling, in combination with lateral buffers, all arranged on the bogie-trucks, substantially as and for the purposes set forth.

In testimony whereof I have signed my name to this specification in the presence of two subscribing witnesses this twenty-sixth day of July, 1870.

JOHN WILLIAM GROVER.

Witnesses:
   THOMAS TAYLOR,
      20 *Southampton Bldgs., Chancery Lane.*
   WM. SHIPWRGHT,
      20 *Southampton Bldgs.*